US012699571B2

(12) United States Patent
Ning et al.

(10) Patent No.: US 12,699,571 B2
(45) Date of Patent: Aug. 4, 2026

(54) ELECTRONIC DEVICE BOOT METHOD AND APPARATUS, SERVER, COMPUTER DEVICE, AND MEDIUM

(71) Applicant: Suzhou MetaBrain Intelligent Technology Co., Ltd., Suzhou (CN)

(72) Inventors: Zhaonan Ning, Suzhou (CN); Binghui Zhang, Suzhou (CN); Fanyi Yao, Suzhou (CN); Muqing Tian, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/137,998

(22) PCT Filed: Mar. 28, 2024

(86) PCT No.: PCT/CN2024/084569
§ 371 (c)(1),
(2) Date: Jun. 11, 2025

(87) PCT Pub. No.: WO2025/091766
PCT Pub. Date: May 8, 2025

(65) Prior Publication Data
US 2026/0017065 A1 Jan. 15, 2026

(30) Foreign Application Priority Data
Oct. 30, 2023 (CN) .......................... 202311414637.0

(51) Int. Cl.
G06F 15/177 (2006.01)
G06F 9/4401 (2018.01)
*G06F 1/24* (2006.01)

(52) U.S. Cl.
CPC .............. G06F 9/4401 (2013.01); *G06F 1/24* (2013.01); *G06F 9/4411* (2013.01)

(58) Field of Classification Search
CPC .... G06F 9/4401; G06F 9/44505; G06F 9/441; G06F 9/4411
(Continued)

(56) References Cited

U.S. PATENT DOCUMENTS 7,287,153 B1 * 10/2007 Hamersley ............ G06F 1/3203
713/1
9,128,729 B1 * 9/2015 Hung .................... G06F 9/4451
(Continued)

FOREIGN PATENT DOCUMENTS

CN 104965729 A 10/2015
CN 106155638 A 11/2016
(Continued)

OTHER PUBLICATIONS

International Search Report of corresponding PCT application (PCT/CN2024/084569) Jul. 3, 2024, including English translation (5 pages).
(Continued)

*Primary Examiner* — Volvick Derose
(74) *Attorney, Agent, or Firm* — Crowell & Moring LLP

(57) ABSTRACT

An electronic device boot method and apparatus, a server, a computer device, and a medium are provided. The electronic device boot method includes: capturing a function setting of a basic transmission function of a to-be-booted electronic device; identifying whether a differential configuration of the function setting exists in a differential memory, where the differential memory includes a plurality of differential configurations applicable to different preset function requirements; and determining, in response to the existence of a differential configuration applicable to a current func-
(Continued)

Capturing a function setting of a basic transmission function of a to-be-booted electronic device — S101

Identifying whether a differential configuration of the function setting is present in a differential memory, where the differential memory includes a plurality of differential configurations applicable to different preset function requirements — S102

Determining, in response to the presence of a differential configuration applicable to a current function requirement in the differential memory, the differential configuration applicable to the current function requirement as a current configuration of the function setting, to respond to invocation of the function setting in a boot process — S103 tion requirement in the differential memory, the differential configuration applicable to the current function requirement as a current configuration of the function setting, to respond to invocation of the function setting in a boot process.

19 Claims, 6 Drawing Sheets

(58) Field of Classification Search
USPC .......................................................... 713/2
See application file for complete search history.

(56) References Cited

U.S. PATENT DOCUMENTS

| 10,303,458 | B2 * | 5/2019 | Ouarraoui | G06F 8/654 |
|---|---|---|---|---|
| 11,231,940 | B2 * | 1/2022 | Bhuiyan | G06F 11/1469 |
| 2003/0065915 | A1 * | 4/2003 | Yu | G06F 11/1417 |
| | | | | 713/1 |
| 2003/0120961 | A1 * | 6/2003 | Cooper | G06F 1/324 |
| | | | | 713/320 |
| 2006/0026416 | A1 * | 2/2006 | Chen | G06F 9/4408 |
| | | | | 713/2 |
| 2006/0069910 | A1 * | 3/2006 | Radhakrishnan | G06F 12/0862 |
| | | | | 713/100 |
| 2009/0327463 | A1 * | 12/2009 | Saito | G06F 9/441 |
| | | | | 709/222 |
| 2010/0205422 | A1 * | 8/2010 | Shao | G06F 9/4403 |
| | | | | 713/100 |
| 2013/0024678 | A1 * | 1/2013 | Yu | G06F 9/44505 |
| | | | | 713/1 |
| 2015/0154033 | A1 * | 6/2015 | Qu | G06F 9/4416 |
| | | | | 713/2 |
| 2015/0163294 | A1 * | 6/2015 | Peterson | H04L 67/104 |
| | | | | 709/201 |
| 2017/0046151 | A1 * | 2/2017 | Hsu | G06F 8/654 |
| 2018/0165456 | A1 * | 6/2018 | Huang | G06F 9/4411 |
| 2020/0097658 | A1 * | 3/2020 | Samuel | G06F 11/0793 |
| 2021/0191738 | A1 * | 6/2021 | Lin | G06F 9/4411 |
| 2021/0240831 | A1 * | 8/2021 | Oncale | G06F 8/65 |
| 2022/0137982 | A1 * | 5/2022 | Samuel | G06F 9/4411 |
| | | | | 713/2 |
| 2023/0214141 | A1 * | 7/2023 | Chien | G06F 3/0673 |
| | | | | 711/105 |
| 2023/0229453 | A1 * | 7/2023 | Chen | G06F 9/4406 |
| | | | | 713/2 |
| 2023/0259366 | A1 * | 8/2023 | Poosapalli | G06F 9/4403 |
| | | | | 713/2 |
| 2023/0393944 | A1 * | 12/2023 | Sun | G06F 11/142 |
| 2024/0036848 | A1 * | 2/2024 | Suryanarayana | G06F 9/4401 |
| 2024/0192740 | A1 * | 6/2024 | Varma | G06F 1/3203 |

FOREIGN PATENT DOCUMENTS

| CN | 111694580 | A | 9/2020 |
|---|---|---|---|
| CN | 111782288 | A | 10/2020 |
| CN | 115080132 | A | 9/2022 |
| CN | 116339838 | A | 6/2023 |
| CN | 117149292 | A | 12/2023 |

OTHER PUBLICATIONS

Written Opinion of International Searching Authority of corresponding PCT application (PCT/CN2024/084569) Jul. 3, 2024, including English translation (8 pages).

Search report of corresponding CN priority application (CN202311414637.0) Jan. 2, 2024 (2 pages).

Notification to Grant Patent Right for Invention of corresponding CN priority application (CN202311414637.0) Jan. 4, 2024 including English translation, and including allowed claims and English translation of allowed claims in corresponding CN priority application CN202311414637.0 (16 pages).

* cited by examiner

| Obtaining a differential memory | ~ S401 |
| Obtaining a hardware identifier of device hardware | ~ S402 |
| Invoking a configuration group matching the hardware identifier in the differential memory to be stored in a sub-memory | ~ S403 |
| Searching the sub-memory for a differential configuration of a function setting | ~ S404 |

ELECTRONIC DEVICE BOOT METHOD AND APPARATUS, SERVER, COMPUTER DEVICE, AND MEDIUM

This application is the national phase application of International Application No. PCT/CN2024/084569, filed Mar. 28, 2024, which claims priority to Chinese Patent Application No. 202311414637.0, filed on Oct. 30, 2023 in China National Intellectual Property Administration and entitled "Electronic Device Boot Method and Apparatus, Server, Computer Device, and Medium". The contents of International Application No. PCT/CN2024/084569 and Chinese Patent Application No. 202311414637.0 are incorporated herein by reference in their entireties.

FIELD

The present application relates to the technical field of electronic device boot management, and particularly relates to an electronic device boot method, an electronic device boot apparatus, a server, a computer device, and a non-transitory computer-readable storage medium.

BACKGROUND

For an electronic device such as a server and a computer, a basic input output system (BIOS) that connects a hardware device and an operating system (OS) is one of the most important components. The main function of the BIOS is to provide the lowest level of direct hardware settings and control for the electronic device. The BIOS also provides some system parameters for the OS.

However, the BIOS usually provides a default version with general settings. The general settings fail to meet the needs of all products. Therefore, it may be necessary to develop BIOS versions for different products separately. When a plurality of sets of BIOS need to be used to control different products, the BIOS normalization is poor.

SUMMARY

The present application provides an electronic device boot method, an electronic device boot apparatus, a server, a computer device, and a non-transitory computer-readable storage medium.

According to an aspect, an electronic device boot method is provided. The electronic device boot method includes: capturing a function setting of a basic transmission function of a to-be-booted electronic device; identifying whether a differential configuration of the function setting exists in a differential memory, where the differential memory includes multigroup differential configurations applicable to different preset function requirements; and determining, in response to a presence of a differential configuration applicable to a current function requirement in the differential memory, the differential configuration applicable to the current function requirement as a current configuration of the function setting, to respond to invocation of the function setting in a boot process.

In one or more embodiments of the present application, in response to capturing the function setting of the basic transmission function at an initial stage of a boot process, the determining the differential configuration applicable to the current function requirement as a current configuration of the function setting, to respond to invocation of the function setting in a boot process includes: returning the differential configuration applicable to the current function requirement to an invocation interface, to respond to invocation of the function setting; and writing, in response to a transition stage of the boot process allowing a write operation to be performed on a transmission chip, an invoked differential configuration into the transmission chip, to update the current configuration corresponding to the function setting.

In one or more embodiments of the present application, the electronic device boot method further includes: in response to at the transition stage, invoking the differential configuration applicable to the current function requirement in the differential memory, and writing the differential configuration applicable to the current function requirement into the transmission chip, to update the current configuration corresponding to the function setting; and capturing a current configuration of a target function setting, to respond to invocation of the target function setting.

In one or more embodiments of the present application, after the identifying whether a differential configuration of the function setting is present in a differential memory, the method further includes: returning, in response to not finding the differential configuration applicable to the current function requirement in the differential memory, a default configuration of the function setting in the transmission chip, to respond to invocation of the function setting.

In one or more embodiments of the present application, the differential memory includes a plurality of configuration groups. Each configuration group is associated with at least one preset function requirement. The preset function requirement includes a hardware adaptation requirement. The identifying whether a differential configuration of the function setting is present in a differential memory includes: searching the plurality of configuration groups for a configuration group matching device hardware in the differential memory as a current action group, where each of the plurality of the configuration groups include a differential configuration of at least one function setting; and searching the current action group for a differential configuration matching the function setting.

In one or more embodiments of the present application, the searching for a configuration group matching device hardware in the differential memory as a current action group includes: obtaining a group identifier matching the device hardware; and identifying a configuration group carrying the group identifier in the differential memory, and invoking the configuration group carrying the group identifier as the current action group.

In one or more embodiments of the present application, the identifying a configuration group carrying the group identifier in the differential memory includes: obtaining address information pointed to by the group identifier; and locating a storage address indicated by the address information in the differential memory, and determining a differential configuration of at least one function setting to which the group identifier is attached in the storage address as the current action group.

In one or more embodiments of the present application, the searching for a configuration group matching device hardware in the differential memory as a current action group includes: identifying a hardware identifier of the device hardware; and matching a configuration group applicable to the hardware identifier in the differential memory as the current action group.

In one or more embodiments of the present application, the hardware identifier includes at least one of a board apparatus identification code or screen printing information.

In one or more embodiments of the present application, after the searching for a configuration group matching device hardware in the differential memory, the method further includes: returning, in response to not matching a configuration group applicable to the device hardware in the differential memory, a default configuration of the function setting in the transmission chip.

In one or more embodiments of the present application, the differential configuration is stored in an internal memory of the electronic device, and a transmission chip stores a default configuration of the function setting. The capturing a function setting of a basic transmission function of a to-be-booted electronic device and the identifying whether a differential configuration of the function setting is present in a differential memory includes: capturing a default configuration of each function setting of the basic transmission function from the transmission chip at an initial stage of the boot process, and obtaining an option identifier of the function setting; invoking the differential memory to query whether the option identifier and a differential configuration corresponding thereto are present in the differential memory; and returning the differential configuration in response to the presence of the option identifier and the differential configuration corresponding thereto in the differential memory, and returning the default configuration in the transmission chip in response to an absence of the option identifier and the differential configuration corresponding thereto in the differential memory.

In one or more embodiments of the present application, the returning the differential configuration and writing the corresponding function setting includes: writing, in response to allowing a write operation to be performed on the transmission chip at a transition stage of the boot process, a returned differential configuration at the initial stage into the function setting of the transmission chip; traversing the differential configuration applicable to the current function requirement in the differential memory, writing a differential configuration not matching the current configuration of the function setting in the transmission chip into the transmission chip, and updating the function setting corresponding to the transmission chip; and capturing, in response to writing the differential configuration applicable to the current function requirement into the transmission chip, a current configuration of each function setting in the transmission chip to respond to invocation of the function setting, and booting the electronic device based on the current configuration.

In one or more embodiments of the present application, the initial stage includes a security verification sub-stage and an extensible firmware interface pre-initialization sub-stage. The transition stage includes a driving execution environment sub-stage and a device boot selection sub-stage.

In one or more embodiments of the present application, the preset function requirement includes a running mode requirement, and running modes include a performance mode, a normal mode, and a power-saving mode. The identifying whether a differential configuration of the function setting is present in a differential memory includes: obtaining a control instruction indicating a target running mode; and identifying mode identifiers of the differential configurations in the differential memory, and returning a differential configuration having a mode identifier matching the target running mode, where the mode identifier is configured to indicate modes applicable to the differential configuration.

In one or more embodiments of the present application, the electronic device boot method further includes: obtaining execution details of at least part of execution nodes, and generating node logs, where the at least part of execution nodes include at least one of a default configuration capturing node, a differential configuration identifying node, or a function setting writing node; and counting node logs of each of abnormal execution nodes having execution abnormalities within at least one historical boot period, confirming abnormal types of the abnormal execution nodes, and performing debugging and troubleshooting for the abnormal types and the abnormal execution nodes.

In one or more embodiments of the present application, the differential memory includes a plurality of configuration groups, and the configuration groups include a differential configuration of at least one function setting. Dividing codes associated with the plurality of configuration groups into a plurality of code modules.

In one or more embodiments of the present application, a default group includes part of the function settings. After the capturing a function setting of a basic transmission function of a to-be-booted electronic device, the method further includes: comparing an option identifier of a currently captured function setting with a default group directory; and returning, in response to the option identifier of the currently captured function setting being contained in the default group directory, a default configuration of the function setting in the transmission chip, to respond to invocation of the function setting.

In one or more embodiments of the present application, the option identifier in the default group directory includes: a central processing unit (CPU) activate core control number, a memory mapped input/output (I/O) high base, a quick boot, a boot mode, a peripheral component interconnect express (PCIE) hot plug, a serial port, and an Internet Protocol Version 4 (IPV4) pre-execution environment boot.

According to another aspect, an electronic device boot apparatus is provided. The electronic device boot apparatus includes: a default memory, a differential memory, and a control module. The default memory includes a default configuration storing a basic transmission function. The differential memory includes multigroup differential configurations applicable to different preset function requirements. The control module is configured to implement the electronic device boot method in any one of the foregoing embodiments.

According to another aspect, a server is provided. The server includes: a body and the electronic device boot apparatus in the foregoing embodiment. The electronic device boot apparatus is disposed on the body.

According to still another aspect, a computer device is provided, including:

one or more processors; and a memory associated with the one or more processors, where the memory is configured to store computer-readable instructions, and the computer-readable instructions, when read and executed by the one or more processors, implement the steps of the foregoing electronic device boot method.

According to yet another aspect, a non-transitory computer-readable storage medium is provided. The non-transitory computer-readable storage medium has computer-readable instructions stored therein. The computer-readable instructions, when executed by one or more processors, implement the steps of the foregoing electronic device boot method.

DETAILED DESCRIPTION

Figure 1:
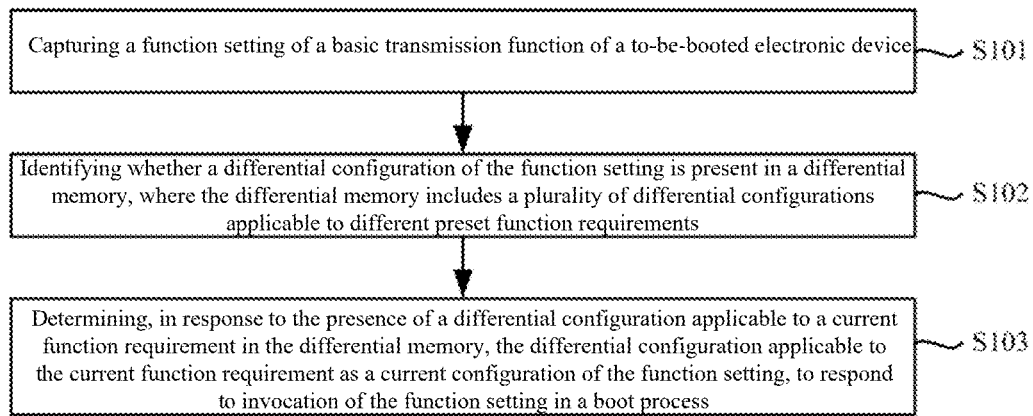
FIG. 1 is a schematic flow chart of an electronic device boot method according to some embodiments of the present application.

In order that the objects, technical solutions, and advantages of the present application will be more clearly understood, the present application will be further described in detail hereinafter with reference to the accompanying drawings and embodiments. It will be appreciated that the embodiments described herein are illustrative of the present application and are not intended to be limiting thereof.

A server is a computer device or an electronic device that runs faster, has higher load, and is more expensive than a normal computer. The server provides computing or application services for other clients (for example, terminals such as personal computers, smart phones, or automatic teller machines, and even large devices such as train systems) in a network. The server has high-speed central processing unit (CPU) computing capabilities, long-term reliable operation, powerful input/output (I/O) external data throughput capabilities, and better scalability.

As a node of the network, the server may store and process about 80% of data and information on the network, which may be the soul of the network. Generally speaking, the server may be compared to switches in post offices. Fixed or mobile network terminals such as microcomputers, notebooks, personal digital assistants (PDA), and mobile phones may be compared to telephones scattered in homes, various offices, and public places. Telephone communications in daily life and work are required to reach a target telephone through the switch. Similarly, if network terminal devices, such as microcomputers in homes and enterprises, are to be networked, the server is required for actions such as obtaining information, communicating with the outside, and entertaining. It may be generally understood that the server is capable of organizing devices connected thereto.

As a high-performance computer that provides various services for client computers on the network, the server may provide a hard disk, a magnetic tape, a printer, a modem, and various special communication devices connected thereto for client sites on the network under the control of a network OS, and may also provide centralized computing, information publishing, and data management services for network users. The high performance of the server is mainly reflected in high-speed computing capabilities, long-term reliable operation, powerful external data throughput capabilities, and so on.

With the rapid development of the server, the requirements for server performance are increasing, and other indicators besides performance are also increasing. The server pays attention to user experience while adapting to user requirements.

A basic transmission system such as a basic input output system (BIOS), as a bridge connecting a hardware device and an operating system (OS), is one of the most important components of the server.

The BIOS is used as an example for description. The BIOS contains rich server functions, and may provide a switch for setting an interface control function. Users may operate and set in a setup interface (such as a SETUP interface) to configure BIOS settings that match a business scenario. The BIOS will provide a set of general settings by default, but due to the diversity of business requirements and user requirements, a set of general BIOS default settings may not cover all products.

For example, products such as artificial intelligence (AI) and high performance computing (HPC) have different function focuses and require different BIOS settings.

For example, a peripheral component interconnect express (PCIE) port of a server supports the speed of a Gen4 specification by default. In response to a determination that it is required to support the speed of a Gen5 specification, an ultra path inter connect link 3 (UPI Link3) in BIOS settings needs to be turned off. If products focus on a transmission speed, the UPI Link3 in the BIOS settings needs to be turned off. If products do not focus on the transmission speed and the UPI Link3 needs to be used, the UPI Link3 in the BIOS settings needs to be turned on. Due to the difference of the BIOS settings, a plurality of sets of codes and a plurality of BIOS versions are used respectively in the related art to control different products.

To resolve the technical problems of version complexity of a basic transmission system and poor normalization degree of the basic transmission system to adapt to user requirements in the related art, the present application provides an electronic device boot method, an electronic device boot apparatus, a server, a computer device, and a non-transitory computer-readable storage medium. Hereinafter, detailed technical solutions of the present application will be described by way of example.

Referring to FIG. 1, FIG. 1 is a schematic flow chart of an electronic device boot method according to some embodiments of the present application. It should be noted that the electronic device is a device such as a computer or a mobile phone, and may be a server or the like. In these embodiments, an example in which the electronic device is a server is used for description.

S101: Capturing a function setting of a basic transmission function of a to-be-booted electronic device.

In present embodiments, a basic transmission system is configured to implement a basic transmission function. The basic transmission function may be a function that may be realized by a transmission chip such as a BIOS chip, and is a basic input output function of the electronic device. The basic transmission function may include a basic input output function, a power-on self-test function, a system self-boot function, a function of providing system parameters for an OS, and the like. This is not limited herein.

Correspondingly, the basic transmission system may include a basic input output program, a post-boot self-test program, and a system self-boot program, and may read and write information of system settings from a CMOS. The basic transmission system may provide the bottom and most direct hardware settings and control for a computer, and may further provide some system parameters for the OS.

The function setting refers to setting/control of a function in a device or system such as a to-be-booted electronic device, a basic transmission system, or a working system.

In a boot process of the to-be-booted electronic device, it is required to continuously capture the function setting in the transmission chip for function configuration. In these embodiments, capture of the function setting may be a capturing operation performed in response to an external invocation, or a capturing operation formed by spontaneously executing program settings. This is not limited herein.

S102: Identifying whether a differential configuration of the function setting is present in a differential memory, where the differential memory includes multigroup differential configurations applicable to different preset function requirements.

In these embodiments, a differential memory for storing at least two sets of differential configurations is further included while a default configuration of the function setting is present in the default memory. The multigroup differential configurations in the differential memory may be applied to at least two preset function requirements. That is, the differential memory has a plurality of differential configurations of at least one function setting, or a differential configuration different from a default setting in the default memory, for adapting to different preset function requirements. Thus, a basic transmission system version may be implemented to adapt to a variety of preset function requirements.

In one or more embodiments, the differential memory may be a hardware module or a software module. This is not limited herein. For example, the differential memory may be an independent storage module, or may be a partial storage space of a module such as an internal memory of an electronic device or a basic transmission system chip. This is not limited herein.

It is easy to understand that the default configuration is a basic configuration of general function settings at the factory, and the differential configuration is a special configuration applicable to function requirements.

In response to capturing the function setting, it is possible to query whether a differential configuration applicable to a current function requirement is present in the differential memory to clarify whether a differential configuration is present in the function setting under the current function requirement, which is beneficial to automatic realization of an electronic device boot process.

S103: Determining, in response to a presence of a differential configuration applicable to a current function requirement in the differential memory, the differential configuration applicable to the current function requirement as a current configuration of the function setting, to respond to invocation of the function setting in a boot process.

In these embodiments, in response to the presence of a differential configuration applicable to a current function requirement in the differential memory, the differential configuration applicable to the current function requirement is invoked as a current configuration of the function setting, to respond to invocation of the function setting. The invocation of the function setting may be a passive response to the invocation of the function setting or an active transfer of the function setting. This is not limited herein.

In one or more embodiments, determining the differential configuration applicable to the current function requirement as a current configuration of the function setting, to respond to invocation of the function setting may be: writing the differential configuration applicable to the current function requirement into the default memory to update the current configuration of the function setting, and then capturing the current configuration of the function setting in the default memory, to respond to invocation of the function setting. In some embodiments, the differential configuration applicable to the current function requirement may be directly returned to an invocation interface as the current configuration of the function setting, to complete a response to invocation of the function setting. In some embodiments, the differential configuration applicable to the current function requirement may be returned to an invocation interface as the current configuration of the function setting, while the differential configuration applicable to the current function requirement is written into the default memory to update the current configuration of the function setting. In some embodiments, the differential configuration applicable to the current function requirement may be returned to an invocation interface as the current configuration of the function setting, and after a period of time, the differential configuration applicable to the current function requirement is written into the default memory to update the current configuration of the function setting. This is not limited herein.

It may be seen that in these embodiments, the differential memory stores multigroup differential configurations applicable to different preset function requirements, which is beneficial to optimizing the normalization of versions of a basic transmission system (such as a BIOS) and improving diversity of a basic transmission system version adapting to products. At the same time, when the function setting is invoked in the boot process, while capturing the default configuration in the transmission chip as conventionally, whether a differential configuration is present is searched in the differential memory. In the presence of a differential configuration, the differential configuration is returned as the current configuration of the function setting, so as to use the differential configuration to respond to invocation of the function setting, whereby the to-be-booted electronic device is configured according to the function requirement in the boot process.

At the same time, in these embodiments, the differential configuration applicable to a plurality of preset function requirements and the default configuration are packaged, self-tested, and managed as a whole. A basic transmission system may adapt to a plurality of electronic device products, thereby alleviating the problem of excessive time cost in the process of update and maintenance. For example, when part of function settings in the basic transmission system are updated, it is not required to perform cumbersome operations such as packaging, self-testing, and management for basic transmission systems of all versions. At the same time, in a management link such as uploading each basic transmission system version, the risk of missing transmission of part of function settings is relatively small, which is beneficial to reducing management risks.

Figure 2:
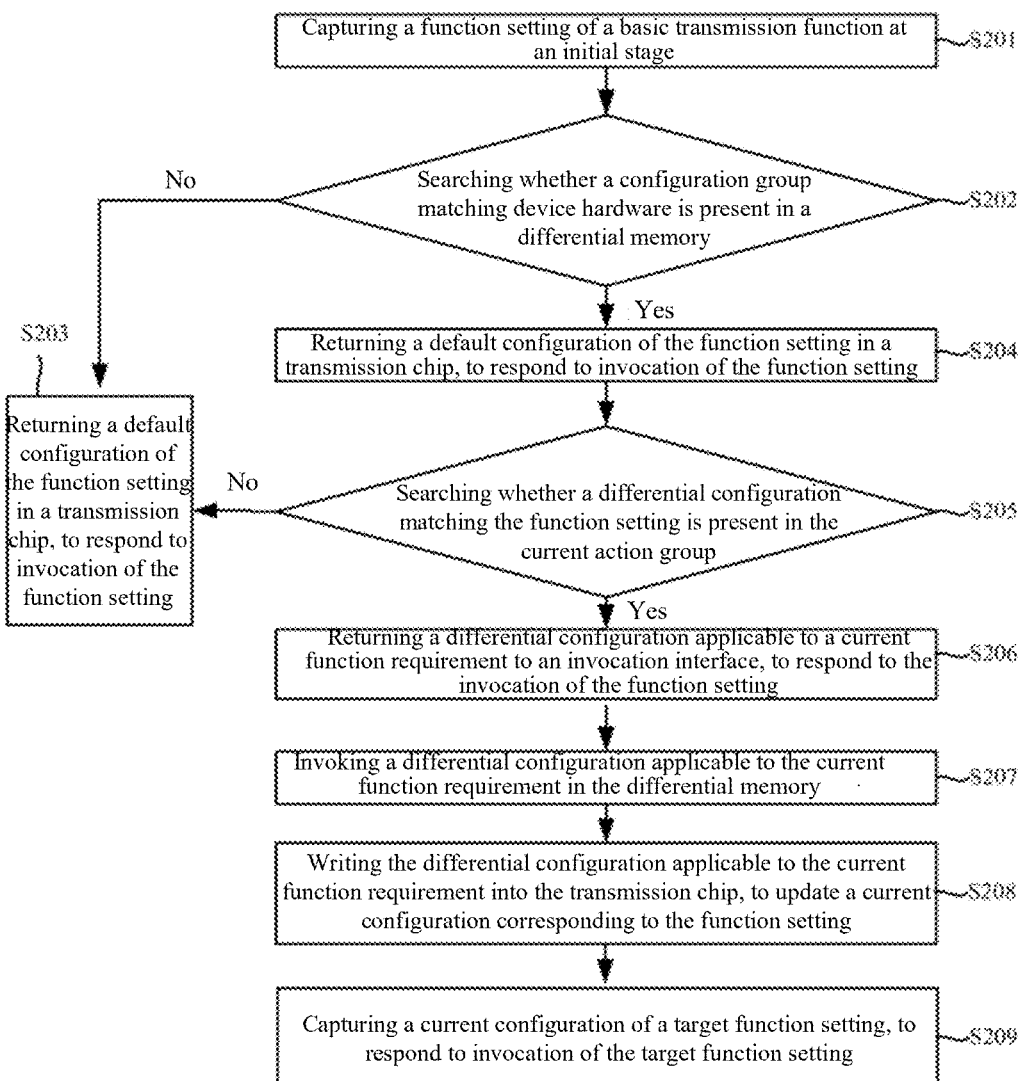
FIG. 2 is another schematic flow chart of the electronic device boot method according to some embodiments of the present application.

Referring to FIG. 2, FIG. 2 is a schematic flow chart of an electronic device boot method according to some embodiments of the present application.

In these embodiments, an electronic device boot process includes an initial stage and a transition stage. The initial stage is a stage in which a transmission chip such as a BIOS chip does not support a write operation. The transition stage is a stage in which the transmission chip supports the write operation. The transition stage is a stage that connects the initial stage and the electronic device boot process.

Further, the initial stage may include: a security verification sub-stage and an extensible firmware interface pre-initialization sub-stage. The transition stage may include: a driving execution environment sub-stage and a device boot selection sub-stage.

For example, an example in which the electronic device is a server is used. The initial stage may include an SEC (security verification) stage and a PEI (EFI pre-initialization) stage. The transition stage may include a DXE (driving execution environment) stage and a BDS (device boot selection) stage. EFI is an extensible firmware interface.

In these embodiments, there are different response policies for the initial stage and the transition stage, which will be described in detail later. It should be noted that step S201 in these embodiments is described by using an example in which the function setting of the basic transmission function is captured from the initial stage of the electronic device boot process, and each implementation process of capturing the function setting in the present application is not strictly limited.

S201: Capturing a function setting of a basic transmission function at an initial stage.

In these embodiments, the function setting may have a default configuration stored in the transmission chip and/or a differential configuration stored in the differential memory.

That is, the differential configuration is stored in the internal memory of the electronic device, and the transmission chip stores the default configuration of the function setting, thereby saving space resources of the transmission chip, and ensuring the running stability and response efficiency of the transmission chip.

In one or more embodiments, each function setting may include an option identifier and a current configuration corresponding to the option identifier. In one or more embodiments, the option identifier may be, for example, a name of a function option visible to a user in a SETUP interface, a common name of an option when an electronic device is installed and configured, or a custom name identifier. The current configuration is a current setting of the option identifier.

For example, the option identifier is a serial peripheral interface (SPI) mode, and the current configuration is a quad mode.

S202: Searching whether a configuration group matching device hardware is present in a differential memory.

In these embodiments, it is determined whether the configuration group matching the device hardware is present in the differential memory. Based on the absence of the configuration group matching the device hardware in the differential memory, it is considered that the differential configuration of the function setting of the basic transmission function is not present in the device hardware. Then step S203 is performed. Based on the presence of the configuration group matching the device hardware in the differential memory, it is considered that the differential configuration is required for the current device hardware. Then step S204 is performed.

The differential configuration of each function setting may be independently stored in the differential memory. In some embodiments, each differential configuration is divided into groups according to a certain division basis and stored in the differential memory. That is, the differential memory includes multigroup of differential configurations applicable to different preset function requirements.

For example, the differential memory includes a plurality of configuration groups. The configuration group includes a differential configuration of at least one function setting.

The configuration groups are respectively associated with at least one preset function requirement. In one or more embodiments, differential configurations applicable to a same preset function requirement may form a configuration group, to reduce the computational burden of identifying the corresponding configuration groups. In some embodiments, differential configurations applicable to a same preset function requirement may form a plurality of configuration groups, which is beneficial to improving the response efficiency of a single configuration group.

In one or more embodiments, the preset function requirement includes a hardware adaptation requirement and/or a running mode requirement. That is, the preset function requirement may include the hardware adaptation requirement. In some embodiments, the preset function requirement may include the running mode requirement. In some embodiments, the preset function requirement may include the hardware adaptation requirement and the running mode requirement, and the configuration group matching the current function requirement needs to adapt to both the hardware adaptation requirement and the running mode requirement. In these embodiments, the hardware adaptation requirement is described by way of example, and the running mode requirement will be described by way of example later.

In one or more embodiments, code related to the present application may be written or packaged in modules, so as to simplify the update and maintenance process of each module and improve the update and maintenance efficiency. For example, codes associated with a plurality of configuration groups may be divided into a plurality of code modules.

S203: Returning a default configuration of the function setting in a transmission chip, to respond to invocation of the function setting.

In these embodiments, in response to the configuration group applicable to the device hardware not matching in the differential memory, it is considered that there is no differential configuration applicable to the current function requirement in the differential memory, and the default configuration of the function setting in the transmission chip may be returned. In one or more embodiments, when it is confirmed that there is no differential configuration applicable to the current function requirement in the differential memory, the default configuration of the function setting in the transmission chip may be directly captured subsequently, and the differential memory is no longer queried, thereby improving the efficiency of responding to invocation of the function setting, reducing cumbersome searching actions, and significantly reducing the computational burden.

And/or, in response to the differential memory not querying the differential configuration applicable to the current function requirement in the differential memory, the default configuration of the function setting in the transmission chip is returned to respond to invocation of the function setting. That is, the default configuration of the function setting in the transmission chip may be returned to respond to invocation of the function setting.

S204: Determining the configuration group matching the device hardware in the differential memory as a current action group.

In these embodiments, in response to the presence of the configuration group matching the device hardware in the differential memory, the configuration group matching the device hardware is determined as the current action group. Thus, the differential configuration may be found from the current action group subsequently, and there is no need to repeatedly locate the configuration group and the differential configuration, which is beneficial to reducing the running burden in the boot process. In one or more embodiments, forming the current action group may be still storing the current action group in the differential memory, or forming a sub-memory and storing the current action group to the sub-memory. This is not limited therein. In one or more embodiments, the sub-memory may be a database or the like. This is not limited therein. An implementation of forming the sub-memory will be described later.

S205: Searching whether a differential configuration matching the function setting is present in the current action group.

In these embodiments, it is determined whether a differential configuration matching the function setting is present by searching from the current action group. When it is determined that there is no differential configuration matching the function setting by searching from the current action group, step S203 is performed. When it is determined that a differential configuration matching the function setting is present by searching from the current action group, the differential memory has a differential configuration applicable to the current function requirement, and then step S206 is performed.

Thus, it is possible to identify whether a differential configuration of the function setting is present in the differential memory through steps S202 to S205.

S206: Returning a differential configuration applicable to a current function requirement to an invocation interface, to respond to the invocation of the function setting.

In these embodiments, in response to the presence of a differential configuration applicable to a current function requirement in the differential memory, the differential configuration applicable to the current function requirement is returned to the invocation interface to respond to invocation of the function setting. Thus, the differential configuration applicable to the current function requirement may be determined as the current configuration of the function setting, to respond to invocation of the function setting.

Further, at a transition stage, the invoked differential configuration may be written to the transmission chip, to update the current configuration corresponding to the function setting, thereby realizing matching between the current configuration in the transmission chip and a true configuration, and improving the truth of the current configuration of the function setting and the consistency with the true configuration.

S207: Invoking a differential configuration applicable to the current function requirement in the differential memory.

In these embodiments, the transmission chip supports a write operation in response to entering the transition stage of the boot process. In some embodiments, the write operation may be performed on the transmission chip. The differential configuration applicable to the current function requirement in the differential memory may be identified, and the differential configuration applicable to the current function requirement in the differential memory is invoked. And the differential configuration is written into the corresponding function setting respectively to update the current configuration of the function setting.

In one or more embodiments, when the differential configuration applicable to the current function requirement is invoked, a differential configuration of the function setting in which the current configuration does not match the differential configuration in the transmission chip may be invoked, thereby reducing useless repetitive writing actions, as will be described in detail below. In some embodiments, it is possible to invoke a differential configuration applicable to all current function requirements, which is beneficial to reducing the calculation amount of separate identification.

S208: Writing the differential configuration applicable to the current function requirement into the transmission chip, to update a current configuration corresponding to the function setting.

In these embodiments, in response to invocation of the differential configuration applicable to the current function requirement in the differential memory at the transition stage, the differential configuration is written into the transmission chip, to update the current configuration corresponding to the function setting.

Thus, the current configuration of the function setting may be directly captured when the function setting is subsequently captured, and there is no need to jump the differential memory/current action group again to query whether a differential configuration is present, which is beneficial to reducing cumbersome jump and invocation operations, thereby reducing the running burden and improving the response efficiency of invocation of the function setting.

In one or more embodiments, an implementation of invoking a differential configuration of the function setting in which the current configuration does not match the differential configuration in the transmission chip is described by way of example.

In response to allowing a write operation to be performed on the transmission chip at the transition stage of the boot process, the returned differential configuration at the initial stage may be written into the function setting of the transmission chip.

Further, the differential configuration applicable to the current function requirement in the differential memory may be traversed, a differential configuration not matching the current configuration of the function setting in the transmission chip may be written into the transmission chip, and the function setting corresponding to the transmission chip may be updated. In response to writing the differential configuration applicable to the current function requirement into the transmission chip, a current configuration of each function setting in the transmission chip is captured to respond to invocation of the function setting, and the electronic device is booted based on the current configuration.

S209: Capturing a current configuration of a target function setting, to respond to invocation of the target function setting.

In these embodiments, in response to writing the differential configuration applicable to the current function requirement in the differential memory into the transmission chip, the current configuration of the function setting may be captured from the transmission chip to respond to invocation of the target function setting.

The following describes, by way of example, that the preset function requirement includes a running mode requirement. Running modes include a performance mode, a normal mode, and a power-saving mode.

The identifying whether a differential configuration of the function setting is present in a differential memory includes the following steps: obtaining a control instruction indicating a target running mode; and identifying mode identifiers of the differential configurations in the differential memory, and returning a differential configuration having a mode identifier matching the target running mode, where the mode identifier is configured to indicate a mode applicable to the differential configuration.

In one or more embodiments, when the preset function requirement includes a hardware adaptation requirement and a running mode requirement, refinement of the differential configuration may be optimized to improve a matching degree between function setting configurations and user requirements.

Further, in these embodiments, execution details of at least part of execution nodes may be obtained, and a node log may be generated. Counting node logs of abnormal execution nodes having execution abnormalities within at least one historical boot period, abnormal types of the abnormal execution nodes are confirmed, and performing debugging and troubleshooting for the abnormal types and the abnormal execution nodes. Thus, when abnormal execution occurs, a node log may be pulled, a node with abnormal execution may be confirmed, and an abnormal type may be determined based on the node log, thereby improving the efficiency of debugging.

In one or more embodiments, the at least part of execution nodes include at least one of a default configuration capturing node, a differential configuration identifying node, or a function setting writing node. That is, at least part of the execution nodes may include a default configuration capturing node or a differential configuration identifying node or a function setting writing node. In some embodiments, at least some of the execution nodes include at least two of the three nodes. In some embodiments, at least part of the execution nodes includes a default configuration capturing node, a differential configuration identifying node, and a function setting writing node. Selecting some relatively important execution nodes is conducive to improving the simplification of node logs.

Certainly, to improve the integrity of the log, all execution nodes may generate execution details.

In one or more embodiments, a default group may be further provided, and the default group is a combination of function settings with unchanged default configurations. The default group includes part of function settings. That is, the default group includes at least one function setting. After the function setting of the basic transmission function is captured, the method further includes the following steps:

comparing an option identifier of a currently captured function setting with a default group directory; and returning, in response to the option identifier of the currently captured function setting being contained in the default group directory, a default configuration of the function setting in the transmission chip, to respond to invocation of the function setting.

The option identifier in the default group directory includes: a CPU activate core control number, a memory mapped I/O (MMIO) high base, a quick boot, a boot mode, a PCIE hot plug, a serial port, and an IPV4 pre-execution environment boot.

For example, the default group may include option identifiers of the following function settings and default configurations corresponding to the function settings:

The option identifier is CPU Activate Core, and the default configuration is 0, which means that all cores are activated. The option identifier is MMIO high base, and the default configuration is Auto, which may effectively reduce the risk of downtime. The option identifier is Quiet Boot, and the default configuration is Enable. The option identifier is Boot Mode, and the default configuration is a unified extensible firmware interface (UEFI), which may support entering an OS. The option identifier is PCIE hot plug, and the default configuration is Enable, to support hot plug functionality. The option identifier is Serial Port, and the default configuration is Enable, to support serial port information output. The option identifier is IPV4 PXE Boot, and the default configuration is Enable, to support PXE boot. The option identifier is SPI Mode, and the default configuration is Quad Mode.

Further, the default group directory may be traversed to identify whether the differential configuration of each function setting in the default group directory has been invoked. In response to that the differential configuration of each function setting in the default group directory has been invoked, it is not necessary to confirm whether the function setting belongs to the default group subsequently, thereby further reducing the computational burden. In response to that the differential configuration of each function setting in the default group directory has not been invoked, namely in the presence of a non-invoked differential configuration of the function setting in the default group directory, it is determined whether the function setting belongs to the default group in a subsequent process until the differential configuration of each function setting in the default group directory has been invoked.

In one or more embodiments, a default identifier may be assigned to a function setting belonging to a default group in the transmission chip. If the default identifier is identified when the function setting is captured, the default configuration of the transmission chip is directly returned, and there is no need to query whether a differential configuration is present in the differential memory, thereby effectively reducing the computational burden of returning the current configuration of the function setting and improving the response efficiency of invocation of the function setting.

Figure 3:
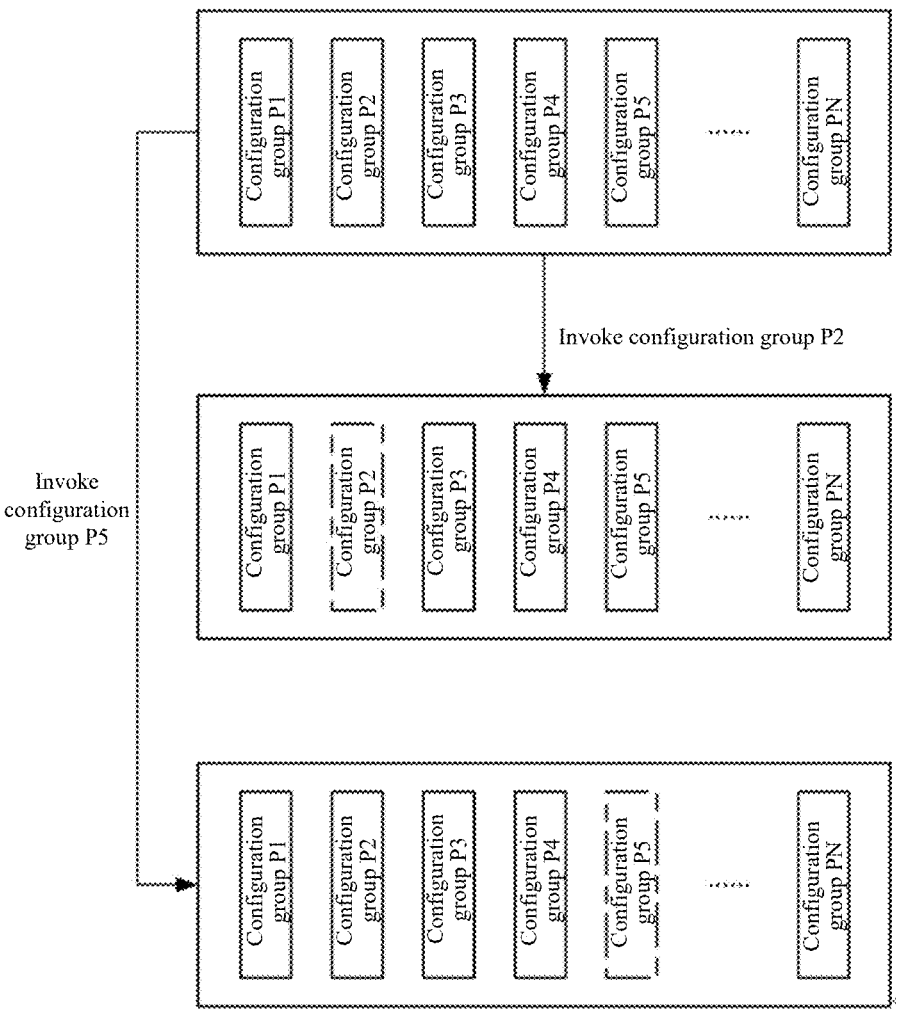
FIG. 3 is a schematic flow chart of invocation of a configuration group according to some embodiments of the present application.

Referring to FIG. 3, FIG. 3 is a schematic flow chart of invocation of a configuration group according to some embodiments of the present application.

In these embodiments, a group identifier matching the device hardware may be obtained. The group identifier may include a label and/or unique information such as function settings, differential configurations, and the like of the configuration group.

A configuration group carrying the group identifier in the differential memory is identified, and the configuration group carrying the group identifier is invoked as the current action group. Address information pointed to by the group identifier is obtained. A storage address indicated by the address information in the differential memory is located, and a differential configuration of at least one function setting to which the group identifier is attached in the storage address is determined as the current action group.

As illustrated by way of example in FIG. 3, group identifiers of configuration groups are P1, P2, P3, . . . , PN, respectively. The configuration group P2 may be invoked when the group identifier of the configuration group adapting to a current function requirement is matched as P2. The configuration group P5 may be invoked when the group identifier of the configuration group adapting to a current function requirement is matched as P5. Details are not described again herein.

In one or more embodiments, a hardware identifier of device hardware may be identified. A configuration group applicable to the hardware identifier in the differential memory is matched as the current action group.

The hardware identifier includes at least one of a board apparatus identification code, such as a board identity document (ID), and screen printing information.

For example, the hardware identifier may include a board apparatus identification code. Information of the device hardware is represented by using the board apparatus identification code, to find a configuration group/differential configuration applicable to the device hardware.

Further, a mapping relationship between the group identifier and the hardware identifier may be established in advance, and the configuration group may be matched by the mapping relationship therebetween.

In one or more embodiments, a default configuration of each function setting of the basic transmission function may be captured from the transmission chip at an initial stage of the boot process, and an option identifier of the function setting may be obtained.

The differential memory is invoked to query whether the option identifier and a differential configuration corresponding thereto are present in the differential memory.

The differential configuration is returned in response to the presence of the option identifier and the differential configuration corresponding thereto in the differential memory. The default configuration in the transmission chip is returned in response to the absence of the option identifier and the differential configuration corresponding thereto in the differential memory.

Furthermore, considering that the hardware design of the electronic device is inconsistent, the number and types of supported devices are also inconsistent, and screen printing information of the device hardware is more complicated. Therefore, the hardware identifier may further include screen printing information, the screen printing information may be preset to the differential memory/configuration group/sub-memory, and the screen printing information may be further matched after the board apparatus identification code is matched, which is beneficial to improving the refinement of the differential configuration.

For example, the screen printing information may include a logo, a hardware name, architecture information, a batch number, a production date (or a manufacturing date), a place of origin, and information of Pin1. Details are not described again herein.

Hereinafter, a implementation of the sub-memory mentioned in step S204 will be described by way of example.

Figure 4:
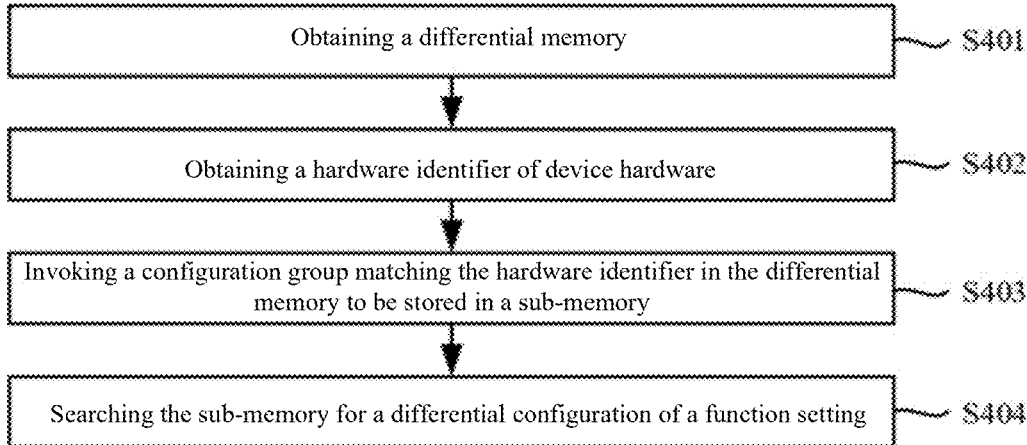
FIG. 4 is a schematic flow chart of construction of a sub-memory according to some embodiments of the present application.

Referring to FIG. 4, FIG. 4 is a schematic flow chart of construction of a sub-memory according to some embodiments of the present application.

S401: Obtaining a differential memory.

In these embodiments, step S401 may be performed before step S101 and step S201. Thus, a sub-memory is formed in advance, and a differential configuration of a function setting may be searched from the sub-memory during subsequent invocation. Certainly, the process of constructing the sub-memory in these embodiments may be executed at any stage in a boot process. This is not limited herein.

S402: Obtaining a hardware identifier of device hardware.

In these embodiments, the hardware identifier of the device hardware may be as described above. The hardware identifier includes at least one of a board apparatus identification code (such as a Board ID) and screen printing information.

For example, the hardware identifier may include a board apparatus identification code. Information of the device hardware is represented by using the board apparatus identification code, to find a configuration group/differential configuration applicable to the device hardware.

The screen printing information may include a logo, a hardware name, architecture information, a batch number, a production date (or a manufacturing date), a place of origin, and information of Pin1. Details are not described again herein.

S403: Invoking a configuration group matching the hardware identifier in the differential memory to be stored in a sub-memory.

In these embodiments, in response to the presence of a configuration group matching the hardware identifier in the differential memory, the configuration group matching the device hardware is invoked to be stored in the sub-memory.

S404: Searching the sub-memory for a differential configuration of a function setting.

In these embodiments, in response to forming the sub-memory storing a differential configuration applicable to a current function requirement, when the differential configuration is subsequently invoked and queried, the query may be performed directly from the sub-memory, thereby reducing the query workload and the operation burden.

In one or more embodiments, the sub-memory may be a custom database, a storage space, or the like. This is not limited therein. An example in which the sub-memory is a database is used. The database may be named a multi project function (MPF) database.

To sum up, an example in which the basic transmission system is a BIOS is used. In the present application, the differential memory may be constructed according to general or customer product requirements. Each general or customer product may have its own unique configuration group. At a boot stage, the BIOS identifies a current hardware identifier and selects the corresponding configuration group. The configuration group is installed in the sub-memory. The differential memory includes differential information of all products, and the information in the sub-memory may be used first when booted later, and default information may be used in response to a determination that demand information is not present in the sub-memory. A special invocation is added. The differential configuration in the sub-memory may be used instead of the default configuration of a BIOS function setting in a BIOS chip. That is, a default setting is stored in the BIOS chip, and a differential setting is stored in the sub-memory. In an early phase of the boot stage, the present application may first search the sub-memory when capturing a BIOS setting from the BIOS chip for system initialization, and use the default setting in the BIOS chip if required setting is not in the sub-memory. In a later phase of the boot stage, when the BIOS chip supports a write operation, the information in the sub-memory is written into the BIOS chip. In the later phase of the boot stage, the BIOS setting is directly captured from the BIOS chip. Thus, the present application may realize normalization of the BIOS setting. In some embodiments, it is possible to integrate a plurality of BIOS versions in the related art, thereby improving adaptation diversity.

Figure 5:
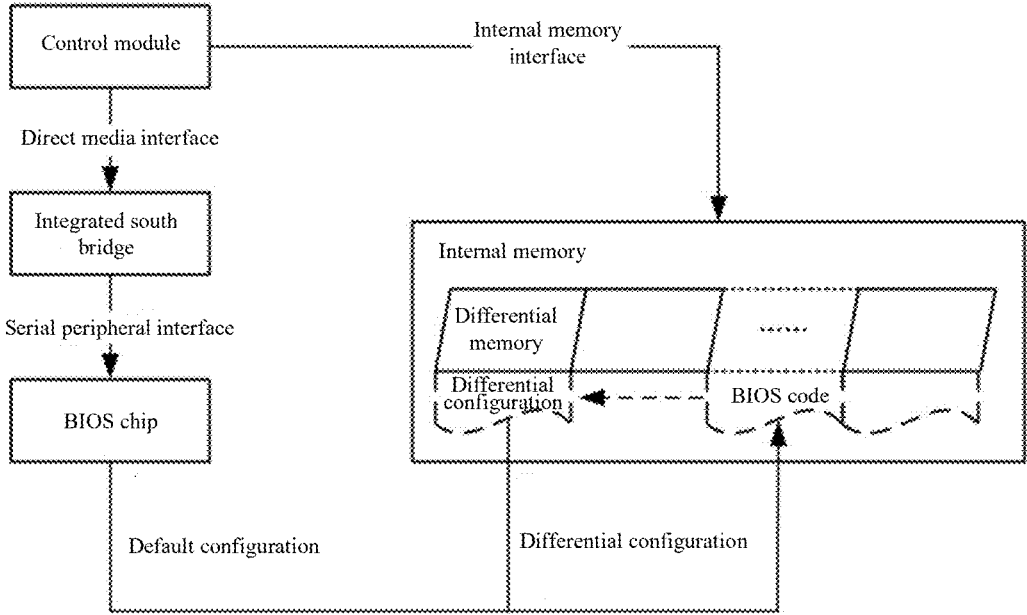
FIG. 5 is a schematic flow chart of a boot method at an initial stage according to some embodiments of the present application.
Figure 6:
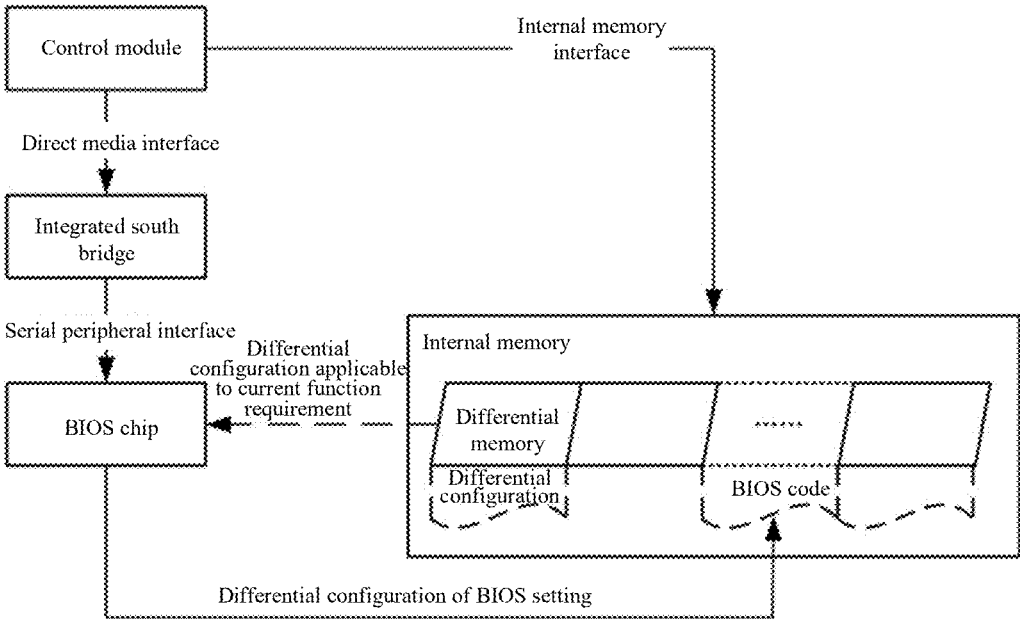
FIG. 6 is another schematic flow chart of the boot method at a transition stage according to some embodiments of the present application.

Referring to FIG. 5 and FIG. 6, FIG. 5 is a schematic flow chart of a boot method at an initial stage according to some embodiments of the present application, and FIG. 6 is a schematic flow chart of a boot method at a transition stage according to some embodiments of the present application.

In these embodiments, an example in which a basic transmission function is a BIOS function is used for description. A control module is connected to an internal memory interface, whereby the control module is connected to an internal memory. The control module is further connected to a BIOS chip through an integrated south bridge. The control module may be connected to the integrated south bridge through a direct media interface (DMI). The integrated south bridge may be connected to the BIOS chip through a serial bus interface such as an SPI.

The internal memory may include a differential memory. The differential memory includes multigroup configuration groups. The configuration group stores differential configurations of a plurality of BIOS settings. In other words, the differential memory may be a partial storage space of the internal memory and may be a virtual module.

In one or more embodiments, the control module may be a processor such as a CPU of an electronic device.

In one or more embodiments, at an initial stage, the present application may simultaneously query whether a default configuration and a differential configuration of the BIOS setting applicable to a current function requirement are present from the internal memory and the BIOS chip, return the differential configuration in the presence of the differential configuration, and return the default configuration in the absence of the differential configuration.

In some embodiments, the internal memory may first be queried whether a differential configuration of the BIOS setting applicable to the current function requirement is present. The differential configuration is returned in the presence of the differential configuration of the BIOS setting applicable to the current function requirement. The default configuration in the BIOS chip is queried and returned in the absence of the differential configuration of the BIOS setting applicable to the current function requirement. Thus, redundant operations of repeatedly searching the BIOS chip may be reduced in the presence of the differential configuration of the function setting, and cumbersome operations of querying the differential configuration may be effectively reduced.

In other words, the capturing a function setting of a basic transmission function of a to-be-booted electronic device and identifying whether a differential configuration of the function setting is present in a differential memory includes: invoking the differential memory at the initial stage of the boot process, to query whether the option identifier and a differential configuration corresponding thereto are present in the differential memory; and returning the differential configuration in response to the presence of the option identifier and the differential configuration corresponding thereto in the differential memory, invoking the transmission chip in response to the absence of the option identifier and the differential configuration corresponding thereto in the differential memory, obtaining a default configuration of the function setting in the transmission chip, and returning the default configuration in the transmission chip to respond to invocation, thereby reducing redundant operations of repeatedly searching the BIOS chip in the presence of the differential configuration of the function setting, and effectively reducing cumbersome operations of querying the differential configuration.

The detailed working principle of first querying the internal memory and then querying the BIOS chip in these embodiments is described below by way of example:

As illustrated in FIG. 5, the BIOS chip does not support a write operation at an initial stage of boot of an electronic device. The control module executes a boot program in the internal memory to carry out the boot process of the electronic device. The boot program may be formed by a BIOS code related to the BIOS illustrated in FIG. 5.

When executing the boot program corresponding to the BIOS code, in response to capturing a BIOS setting of a BIOS function of the electronic device, the control module may first communicate with the differential memory of the internal memory through the internal memory interface, and query whether a configuration group using a current preset function requirement (such as a hardware adaptation requirement or a running mode requirement) is present in the differential memory.

A configuration group applicable to the current preset function requirement in the internal memory is determined as a current action group, and a differential configuration applicable to a current BIOS setting is queried from the current action group. The differential configuration may carry a label of the BIOS setting corresponding thereto. In some embodiments, the internal memory further stores a correspondence between the differential configurations and the BIOS settings. This is not limited herein.

In response to the presence of a differential configuration of the BIOS setting in the current action group, the differential configuration is returned to an invocation interface, where the invocation interface may be a BIOS code or a destination address indicated by the BIOS code. In response to the absence of a differential configuration of the BIOS setting in the current action group, the control module is connected to the BIOS chip through the integrated south bridge, queries a default configuration of the BIOS setting in the BIOS chip, and returns the queried default configuration to the invocation interface.

As illustrated in FIG. 6, in response to entering/being in a transition stage of boot of the electronic device, a differential configuration applicable to the current function requirement in the internal memory may be written into the BIOS chip, a current configuration corresponding to the BIOS setting is updated.

A dashed arrow between the differential memory and the BIOS chip in FIG. 6 illustrates the operation of writing the differential configuration applicable to the current function requirement into the BIOS chip. For example, the differential memory may be connected to the BIOS chip, and the control module controls to write the differential configuration from the internal memory to the BIOS chip. In some embodiments, the differential configuration may be read from the internal memory and then written into the BIOS chip via the control module. This is not limited herein.

In one or more embodiments, the differential configuration written into the BIOS chip may be a differential configuration that is fully applicable to the current function requirement, a differential configuration that is not invoked at the initial stage, or a differential configuration that is different from the current configuration of the BIOS setting in the BIOS chip. This is not limited herein.

In response to writing the differential configuration applicable to the current function requirement into the BIOS chip, the control chip executes the boot program corresponding to the BIOS code. When configuration parameters of the BIOS setting need to be invoked, the control chip may be connected to the BIOS chip through the integrated south bridge to obtain the current configuration of the BIOS setting in the BIOS to respond to the boot program, until the boot of the electronic device is completed.

It will be appreciated that although the various steps in the flow charts of FIG. 1 to FIG. 6 are shown in sequence as indicated by arrows, these steps are not necessarily performed in the order indicated by the arrows. These steps are performed in no strict order unless explicitly stated herein, and these steps may be performed in other orders. Moreover, at least some of the steps in FIG. 1 to FIG. 6 may include a plurality of sub-steps or a plurality of stages. These sub-steps or stages are not necessarily performed at the same time, but may be performed at different times. These sub-steps or stages are not necessarily performed in sequence, but may be performed in turn or in alternation with other steps or at least some of the sub-steps or stages in other steps.

Figures 7, 8:
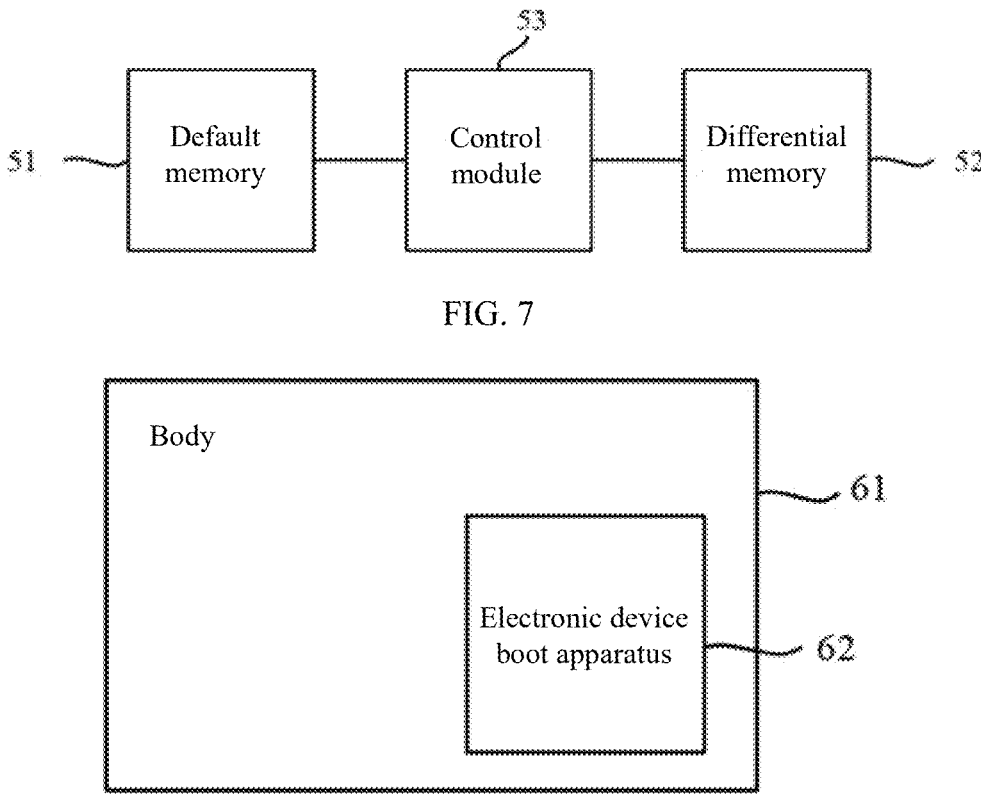
FIG. 7 is a schematic structural diagram of an electronic device boot apparatus according to some embodiments of the present application.
FIG. 8 is a schematic structural diagram of a server according to some embodiments of the present application.

Referring to FIG. 7, FIG. 7 is a schematic structural diagram of an electronic device boot apparatus according to some embodiments of the present application.

In these embodiments, the electronic device boot apparatus includes a default memory 51, a differential memory 52, and a control module 53. The default memory 51 includes a default configuration storing a basic transmission function. The differential memory 52 includes a plurality of differential configurations applicable to different preset function requirements. The control module 53 is configured to implement the electronic device boot method in any one of the foregoing embodiments.

For a limitation of the electronic device boot apparatus, refer to the foregoing limitation of the electronic device boot method. Details are not described again herein. The various modules in the electronic device boot apparatus may be implemented in whole or in part by software, hardware, and combinations thereof. The various modules may be embedded in hardware or separate from a processor in a computer device, or may be stored in software in a memory in the computer device, whereby the processor invokes operations corresponding to the above modules.

Referring to FIG. 8, FIG. 8 is a schematic structural diagram of a server according to some embodiments of the present application. In these embodiments, the server includes a body 61 and an electronic device boot apparatus 62 in the foregoing embodiment. The electronic device boot apparatus 62 may be described in the foregoing embodiment. The electronic device boot apparatus 62 includes a default memory 51, a differential memory 52, and a control module 53 (as shown in FIG. 5). Details are not described again herein. The electronic device boot apparatus 62 is disposed on the body 61. Thus, basic transmission systems of a same version may be applied to a plurality of servers.

Figure 9:
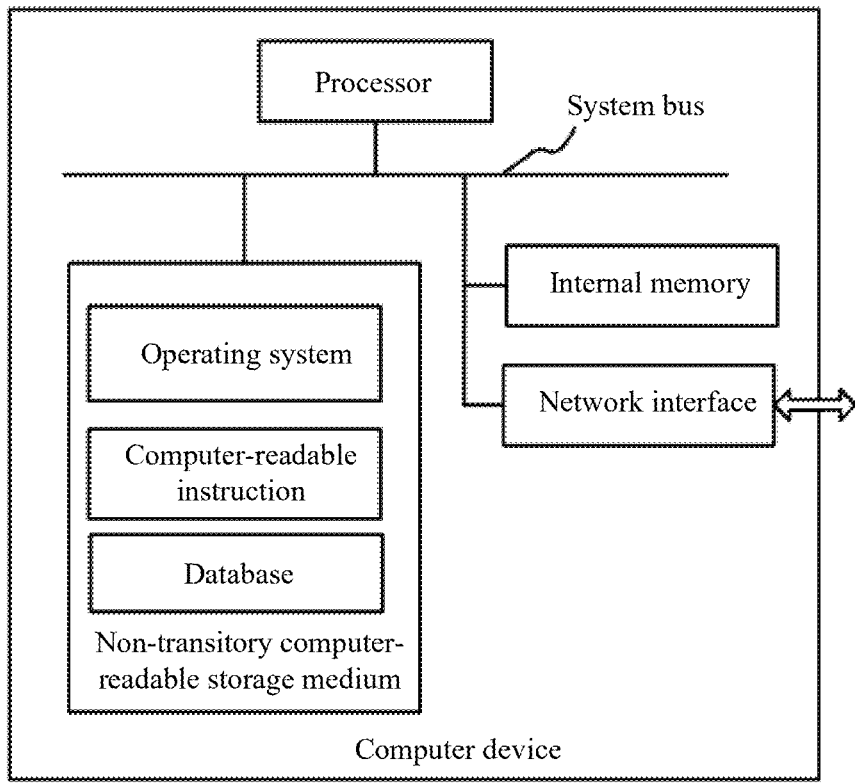
FIG. 9 is a schematic structural diagram of a computer device according to some embodiments of the present application.

Referring to FIG. 9, FIG. 9 is a schematic structural diagram of a computer device according to some embodiments of the present application.

In these embodiments, the computer device may be a server. An internal structure diagram of the computer device may be illustrated as exemplified in FIG. 9. The computer device includes a processor, a memory, a network interface, and a database connected via a system bus. The processor of the computer device is configured to provide computing and control capabilities. The memory of the computer device includes a non-transitory storage medium and an internal memory. The non-transitory storage medium stores an OS, computer-readable instructions, and a database. The internal memory provides an environment for the operation of the OS and the computer-readable instructions in the non-transitory storage medium. The database of the computer device is configured to store differential configuration data of a function setting. The network interface of the computer device is configured to communicate with an external terminal via a network connection. The computer-readable instructions, when executed by the processor, implement an electronic device boot method.

It will be appreciated by a person skilled in the art that the structure shown in FIG. 9 is merely a block diagram of some of the structures relevant to the solution of the present application and does not constitute a limitation of a computer device to which the solution of the present application is applied. The computer device may include more or fewer components than those shown in the figures, or include some components combined, or have different component arrangements.

In one or more embodiments, a computer device is provided, including one or more processors, and a memory associated with the one or more processors. The memory is configured to store computer-readable instructions. The computer-readable instructions, when read and executed by the one or more processors, implement the following steps:

S101: Capturing a function setting of a basic transmission function of a to-be-booted electronic device.

S102: Identifying whether a differential configuration of the function setting is present in a differential memory, where the differential memory includes multigroup differential configurations applicable to different preset function requirements.

S103: Determining, in response to the presence of a differential configuration applicable to a current function requirement in the differential memory, the differential configuration applicable to the current function requirement as a current configuration of the function setting, to respond to invocation of the function setting in a boot process.

Figure 10:
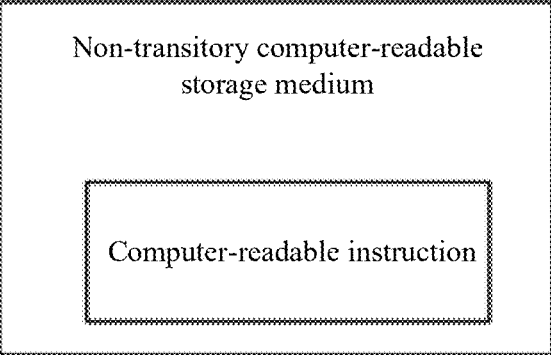
FIG. 10 is a schematic structural diagram of a non-transitory computer-readable storage medium according to some embodiments of the present application.

In one or more embodiments, as shown in FIG. 10, a non-transitory computer-readable storage medium is provided. The non-transitory computer-readable storage medium has computer-readable instructions stored therein. The computer-readable instructions, when executed by one or more processors, implement the following steps:

S101: Capturing a function setting of a basic transmission function of a to-be-booted electronic device.

S102: Identifying whether a differential configuration of the function setting is present in a differential memory, where the differential memory includes multigroup differential configurations applicable to different preset function requirements.

S103: Determining, in response to the presence of a differential configuration applicable to a current function requirement in the differential memory, the differential configuration applicable to the current function requirement as a current configuration of the function setting, to respond to invocation of the function setting in a boot process.

A person of ordinary skill in the art may appreciate that all or some of processes of the foregoing method embodiments may be implemented by computer-readable instructions instructing relevant hardware. The computer-readable instructions may be stored in a non-transitory computer-readable storage medium. When the computer-readable instructions are executed, the processes of the foregoing method embodiments may be included. Any reference to a memory, storage, a database, or another medium used in the various embodiments provided by the present application may include non-transitory and/or transitory memories. The non-transitory memory may include a read-only memory (ROM), a programmable ROM (PROM), an electrically programmable ROM (EPROM), an electrically erasable programmable ROM (EEPROM), or a flash memory. The transitory memory may include a random access memory (RAM) or an external cache. By way of illustration and not limitation, the RAM is available in various forms, such as a static RAM (SRAM), a dynamic RAM (DRAM), a synchronous DRAM (SDRAM), a dual data rate SDRAM (DDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features of the foregoing embodiments may be combined in any combination, and in order to make the description concise, not all the possible combinations of the technical features in the foregoing embodiments are described. However, as long as there is no contradiction between the combinations of these technical features, the combinations should be considered as the scope of the description.

The foregoing embodiments express a few implementations of the present application, which are described in greater detail but are not to be construed as limiting the scope of the present application. It will be appreciated by a person of ordinary skill in the art that numerous variations and modifications may be made without departing from the concept of the present application, which fall within the protection scope of the present application. Therefore, the protection scope of the present application should be determined by the appended claims.

The invention claimed is:

1. An electronic device boot method, comprising:
capturing a function setting of a basic transmission function of a to-be-booted electronic device;
identifying whether a differential configuration of the function setting is present in a differential memory, the differential memory comprising multigroup differential configurations applicable to different preset function requirements and a plurality of configuration groups, each configuration group is associated with at least one preset function requirement, and the present function requirement comprises a hardware adaptation requirement, and wherein the identifying whether a differential configuration of the function setting is present in a differential memory comprises:
searching the plurality of configuration groups for a configuration group matching device hardware in the differential memory as a current action group, each of the plurality of configuration groups comprising a differential configuration of at least one function setting; and
searching the current action group for a differential configuration matching the function setting; and
determining, in response to a presence of a differential configuration applicable to a current function requirement in the differential memory, the differential configuration applicable to the current function requirement as a current configuration of the function setting, to respond to invocation of the function setting in a boot process;
wherein after the identifying whether a differential configuration of the function setting is present in a differential memory, the method further comprises:
returning, in response to not finding the differential configuration applicable to the current function requirement in the differential memory, a default configuration of the function setting in the transmission chip, to respond to the invocation of the function setting.

2. The electronic device boot method according to claim 1, wherein
in response to capturing the function setting of the basic transmission function at an initial stage of the boot process, the determining the differential configuration applicable to the current function requirement as a current configuration of the function setting, to respond to invocation of the function setting in a boot process comprises:
returning the differential configuration applicable to the current function requirement to an invocation interface, to respond to the invocation of the function setting; and writing, in response to a transition stage of the boot process allowing a write operation to be performed on a transmission chip, an invoked differential configuration into the transmission chip, to update the current configuration corresponding to the function setting.

3. The electronic device boot method according to claim 2, further comprising:
in response to at the transition stage, invoking the differential configuration applicable to the current function requirement in the differential memory, and writing the differential configuration applicable to the current function requirement into the transmission chip, to update the current configuration corresponding to the function setting; and
capturing a current configuration of a target function setting, to respond to invocation of the target function setting.

4. The electronic device boot method according to claim 1, wherein the searching the plurality of configuration groups for a configuration group matching device hardware in the differential memory as a current action group comprises:
obtaining a group identifier matching the device hardware; and
identifying a configuration group carrying the group identifier in the differential memory, and invoking the configuration group carrying the group identifier as the current action group.

5. The electronic device boot method according to claim 4, wherein the identifying a configuration group carrying the group identifier in the differential memory comprises:
obtaining address information pointed to by the group identifier; and
locating a storage address indicated by the address information in the differential memory, and determining a differential configuration of at least one function setting to which the group identifier is attached in the storage address as the current action group.

6. The electronic device boot method according to claim 1, wherein the searching the plurality of configuration groups for a configuration group matching device hardware in the differential memory as a current action group comprises:
identifying a hardware identifier of the device hardware; and
matching a configuration group applicable to the hardware identifier in the differential memory as the current action group.

7. The electronic device boot method according to claim 6, wherein the hardware identifier comprises at least one of a board apparatus identification code or screen printing information.

8. The electronic device boot method according to claim 6, wherein after the matching a configuration group applicable to the hardware identifier in the differential memory as the current action group, further comprising:
invoking the configuration group applicable to the hardware identifier in the differential memory to be stored in a sub-memory; and
searching the sub-memory for the differential configuration of the function setting.

9. The electronic device boot method according to claim 1, wherein after the searching the plurality of configuration groups for a configuration group matching device hardware in the differential memory, the method further comprises:
returning, in response to not matching a configuration group applicable to the device hardware in the differential memory, a default configuration of the function setting in a transmission chip.

10. The electronic device boot method according to claim 1, wherein the differential configuration is stored in an internal memory of the electronic device, and a transmission chip stores a default configuration of the function setting; and the capturing a function setting of a basic transmission function of a to-be-booted electronic device and the identifying whether a differential configuration of the function setting is present in a differential memory comprises:

capturing a default configuration of each function setting of the basic transmission function from the transmission chip at an initial stage of the boot process, and obtaining an option identifier of the function setting;

invoking the differential memory to query whether the option identifier and a differential configuration corresponding to the function setting are present in the differential memory; and returning the differential configuration corresponding to the function setting in response to a presence of the option identifier and the differential configuration corresponding to the function setting in the differential memory, and returning the default configuration in the transmission chip in response to an absence of the option identifier and the differential configuration corresponding to the function setting in the differential memory.

11. The electronic device boot method according to claim 10, wherein the returning the differential configuration corresponding to the function setting comprises:

writing, in response to allowing a write operation to be performed on the transmission chip at a transition stage of the boot process, a returned differential configuration at the initial stage into the function setting of the transmission chip;

traversing the differential configuration applicable to the current function requirement in the differential memory, writing a differential configuration not matching the current configuration of the function setting in the transmission chip into the transmission chip, and updating the current differential configuration of the function setting corresponding to the transmission chip; and capturing, in response to writing the differential configuration applicable to the current function requirement into the transmission chip, a current configuration of each function setting in the transmission chip to respond to the invocation of the function setting, and booting the electronic device based on the current configuration.

12. The electronic device boot method according to claim 11, wherein the initial stage comprises a security verification sub-stage and an extensible firmware interface pre-initialization sub-stage; and the transition stage comprises a driving execution environment sub-stage and a device boot selection sub-stage.

13. The electronic device boot method according to claim 1, wherein the different preset function requirements comprise a running mode requirement, running modes comprising a performance mode, a normal mode, and a power-saving mode; and the identifying whether a differential configuration of the function setting is present in a differential memory comprises:

obtaining a control instruction indicating a target running mode; and identifying mode identifiers of differential configurations in the differential memory, and returning a differential configuration having a mode identifier matching the target running mode, the mode identifiers being configured to indicate modes applicable to the differential configurations.

14. The electronic device boot method according to claim 1, wherein the electronic device boot further comprises:

obtaining execution details of at least part of execution nodes, and generating node logs, the at least part of execution nodes comprising at least one of a default configuration capturing node, a differential configuration identifying node, or a function setting writing node; and counting node logs of each of abnormal execution nodes having execution abnormalities within at least one historical boot period, confirming abnormal types of the abnormal execution nodes, and performing debugging and troubleshooting for the abnormal types and the abnormal execution nodes.

15. The electronic device boot method according to claim 1, wherein each of the plurality of the configuration groups further comprises a differential configuration of at least one function setting; and dividing codes associated with the plurality of configuration groups into a plurality of code modules.

16. The electronic device boot method according to claim 1, wherein a default group comprises part of the function setting, and after the capturing a function setting of a basic transmission function of a to-be-booted electronic device, the method further comprises:

comparing an option identifier of a currently captured function setting with a default group directory; and returning, in response to the option identifier of the currently captured function setting being contained in the default group directory, a default configuration of the function setting in a transmission chip, to respond to the invocation of the function setting.

17. The electronic device boot method according to claim 16, wherein the option identifier in the default group directory comprises: a central processing unit (CPU) activate core control number, a memory mapped input/output (I/O) high base, a quick boot, a boot mode, a peripheral component interconnect express (PCIE) hot plug, a serial port, and an Internet Protocol Version 4 (IPV4) pre-execution environment boot.

18. A computer device, comprising:

a memory storing computer-readable instructions; and one or more processors configured to read and execute the computer-readable instructions, wherein upon execution of the computer-readable instructions, the one or more processors is configured to:

capture a function setting of a basic transmission function of a to-be-booted electronic device;

identify whether a differential configuration of the function setting is present in a differential memory, the differential memory comprising multigroup differential configurations applicable to different preset function requirements and a plurality of configuration groups, each configuration group is associated with at least one preset function requirement, and the present function requirement comprises a hardware adaptation requirement, and wherein to identify whether a differential configuration of the function setting is present in a differential memory, the one or more processors, upon execution of the computer-readable instructions, is configured to:

search the plurality of configuration groups for a configuration group matching device hardware in the differential memory as a current action group, each of the plurality of configuration groups comprising a differential configuration of at least one function setting; and search the current action group for a differential configuration matching the function setting; and determine, in response to a presence of a differential configuration applicable to a current function requirement in the differential memory, the differential configuration applicable to the current function requirement as a current configuration of the function setting, to respond to invocation of the function setting in a boot process;

wherein after the identification of whether the differential configuration of the function setting is present in the differential memory, the one or more processors, upon execution of the computer-readable instructions, is further configured to:

return, in response to not finding the differential configuration applicable to the current function requirement in the differential memory, a default configuration of the function setting in the transmission chip, to respond to the invocation of the function setting.

19. A non-transitory computer-readable storage medium, having computer-readable instructions stored therein, the computer-readable instructions, when executed by one or more processors, is configured to cause the one or more processors to:

capture a function setting of a basic transmission function of a to-be-booted electronic device;

identify whether a differential configuration of the function setting is present in a differential memory, the differential memory comprising multigroup differential configurations applicable to different preset function requirements and a plurality of configuration groups, each configuration group is associated with at least one preset function requirement, and the present function requirement comprises a hardware adaptation requirement, and wherein for the one or more processors to identify whether a differential configuration of the function setting is present in a differential memory, the computer-readable instructions, when executed by the one or more processors, is configured to cause the one or more processors to:

search the plurality of configuration groups for a configuration group matching device hardware in the differential memory as a current action group, each of the plurality of configuration groups comprising a differential configuration of at least one function setting; and search the current action group for a differential configuration matching the function setting; and determine, in response to a presence of a differential configuration applicable to a current function requirement in the differential memory, the differential configuration applicable to the current function requirement as a current configuration of the function setting, to respond to invocation of the function setting in a boot process;

wherein after the identification of whether the differential configuration of the function setting is present in the differential memory, the computer-readable instructions, when executed by the one or more processors, is further configured to cause the one or more processors to:

return, in response to not finding the differential configuration applicable to the current function requirement in the differential memory, a default configuration of the function setting in the transmission chip, to respond to the invocation of the function setting.

* * * * *